United States Patent [19]

Paller

[11] 4,012,594

[45] Mar. 15, 1977

[54] KEYBOARD OPERATED TERMINAL APPARATUS

[76] Inventor: Emanuel Marvin Paller, 20200 Marilla Court, Saratoga, Calif. 95070

[22] Filed: Aug. 6, 1974

[21] Appl. No.: 495,254

[52] U.S. Cl. .................... 179/2 DP; 178/17.5
[51] Int. Cl.² ................. G06F 3/14; H04M 11/06
[58] Field of Search .......... 179/2 DP, 3, 4, 90 AN, 179/90 K; 340/172.5, 365 R; 178/17 R, 17 A, 17.5, 24

[56] References Cited

UNITED STATES PATENTS

| 3,166,636 | 1/1965 | Rutland et al. | 178/24 |
| 3,368,028 | 2/1968 | Windels et al. | 178/17.5 X |
| 3,380,031 | 4/1968 | Clayton et al. | 340/172.5 |
| 3,456,242 | 7/1969 | Lubkin et al. | 340/172.5 |
| 3,623,157 | 11/1971 | Stapleford | 340/172.5 |
| 3,685,019 | 8/1972 | Conroy et al. | 340/172.5 |
| 3,739,344 | 6/1973 | Serracchioli et al. | 340/172.5 |
| 3,820,080 | 6/1974 | Abrams et al. | 340/172.5 |
| 3,822,363 | 7/1974 | Moyer et al. | 179/2 DP |
| 3,828,174 | 8/1974 | Nakamura et al. | 340/172.5 |

*Primary Examiner*—Thomas A. Robinson

[57] ABSTRACT

A keyboard operated terminal apparatus includes a main memory for storing a number of frames of data, and a display memory for storing a selected frame of such data. The two memories are coupled in a closed feedback loop, thereby enabling recall, deletion, insertion and display of any selected data frame. Data words are moved through the loop, and the data bits are synchronized by a timing clock circuit.

8 Claims, 2 Drawing Figures

KEYBOARD OPERATED TERMINAL APPARATUS

BACKGROUND OF THE INVENTION

1. Field of the Invention

This invention relates to a keyboard operated terminal apparatus.

2. Description of the Prior Art

Computers are useful for providing rapid computation and processing of data. However, the small business or average homeowner cannot afford to own an expensive processor, even of the minicomputer type, but can use a processor on a time sharing basis. Various tasks may be performed for the small user, such as payroll preparation, inventory control, recording of monthly charges, record of checks disbursed, account balances and the like. It would be helpful to provide an inexpensive, relatively small capacity terminal, that may be coupled to a processor on a time share basis, which will store certain data, perform various calculations, and provide a readout when so desired to a user, such as a small shopkeeper or a homeowner.

SUMMARY OF THE INVENTION

An object of this invention is to provide a novel and improved keyboard operated terminal for use with relatively small data banks.

Another object of this invention is to provide a terminal that allows slow entry of data, for subsequent processing by a relatively rapid data processor.

Another object is to provide an apparatus that may be used as a terminal, enabling data processing, and providing an immediate display of stored and processed data.

According to this invention, a keyboard operated terminal apparatus includes a memory loop comprising a main memory and a smaller display memory coupled to the output of a keyboard. Frames of data are moved in the loop, and the display memory stores one frame of data at a time, which may be displayed. The memory loop is under control of a clocking network that includes a loop counter, so that the data moved through the memories may be synchronized and tracked. The terminal apparatus may be coupled through a digital to audio converter via normal phone lines to a central processor, which serves to modify the data and respond to programmed commands in a well known manner.

DESCRIPTION OF THE DRAWING

Figure 1A:
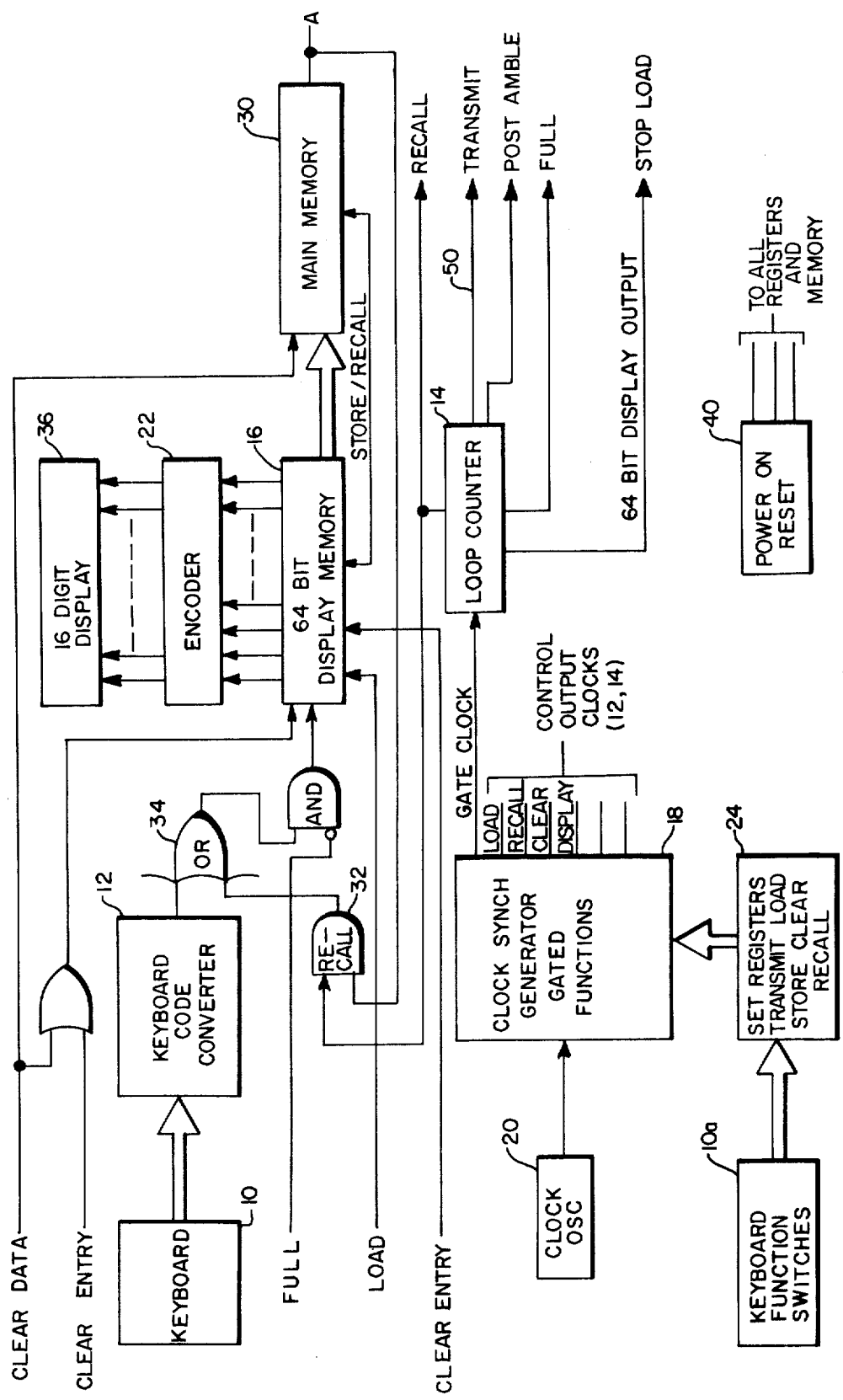
Figure 1B:
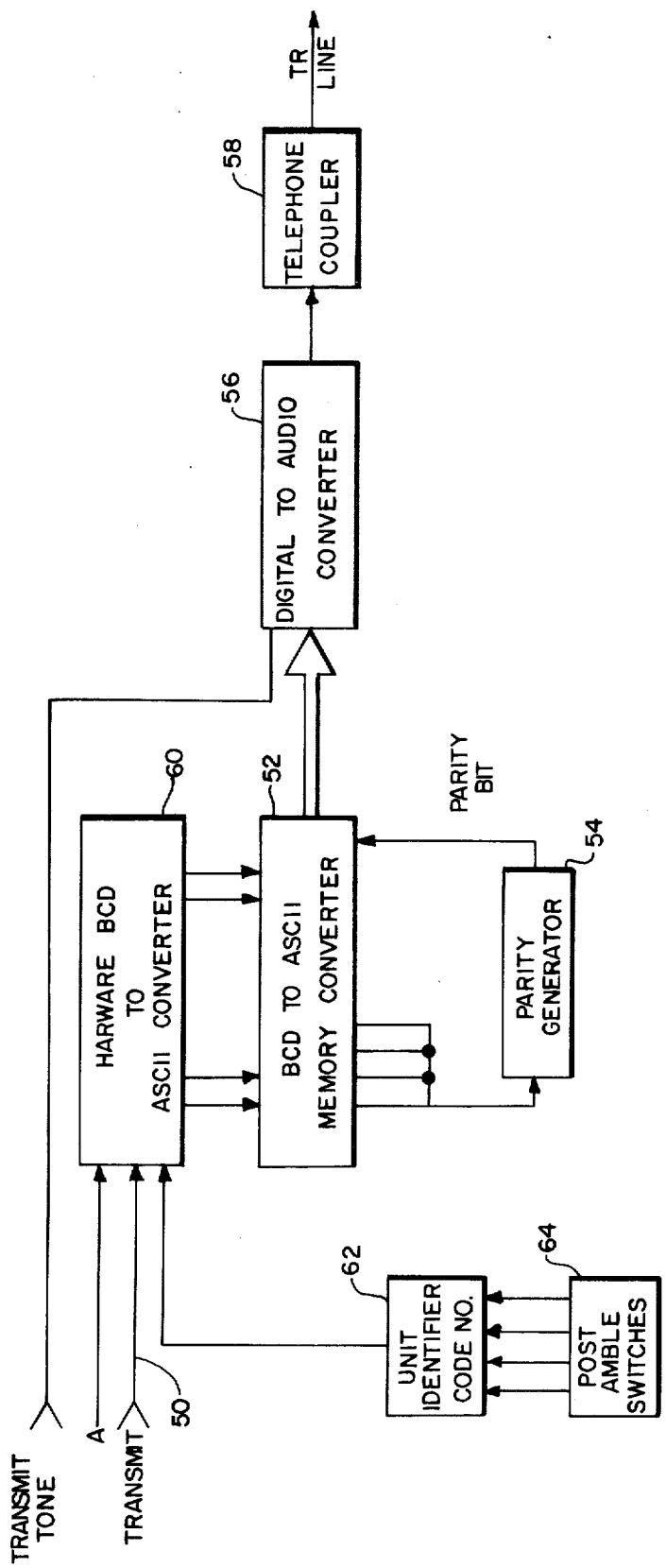

Detailed description is provided with reference to the accompanying drawing:

FIGS. 1A and 1B are schematic block diagrams depicting the terminal apparatus of this invention.

DETAILED DESCRIPTION OF THE INVENTION

The terminal apparatus of this invention, as illustrated in FIGS. 1A and 1B, includes a keyboard 10 having a multiplicity of manually operable keys. The keys designate functions to be performed, including entry, recall, clear memory, clear entry and transmit; and also may represent alphanumeric characters to be entered into memory.

When operation of the system is first initiated and power is turned on, all the registers and memories in the system are automatically reset as represented by block 40, which is a self-contained circuit. When the keyboard 10 is operated, a keyboard code converter 12 is loaded, during which a load register located in a loop counter 14 is set. A given number of bits, four BCD (binary coded decimal) bits representing one character, for example, are transferred to a 64 bit display memory 16, which has a limited capacity, such as 64 bits. The bit transfer from the converter 12 to the display memory 16 takes place in response to a delayed signal that is generated by a clock sync. generator 18 in synchronism with a timing circuit.

The timing circuit includes a clock oscillator 20 that provides a clock signal at a nominal frequency. The clock signal synchronizes and gates the available functions that are generated by the clock sync. generator 18 in response to actuation of any of the function keys of the keyboard 10. These functions include (1) LOAD-ENTER (2) RECALL (3) CLEAR DISPLAY (4) CLEAR MEMORY and (5) TRANSMIT. The keyboard 10 also includes keys for entering data in the form of alphanumeric characters, each character consisting of 4 BCD bits, according to this specific embodiment of the invention.

The LOAD-ENTER key allows entry of data and loading of the memories of the apparatus. The RECALL key acts to recall data from memory. The CLEAR DISPLAY key clears and resets the visual display, by resetting the display memory 16. The TRANSMIT function permits sending the stored data to a processor, for example via telephone line transmission.

Coupled to the output of the display memory 16 is the main memory 30, which stores several frames of data, say 64, plus the frame that is stored in the display memory at any given time. The data in the main memory is moved serially, frame by frame, in a closed feedback loop, which includes the two memories and a RECALL gate 32 and OR gate 34. The moving data is timed and tracked by the loop counter 14.

The display memory 16 may contain one frame of four bit characters (16 characters per frame) that are fed in parallel to an encoder 22. The encoder serves as a buffer and drives a selected group of 16 available display sections of a visual display 36. The display sections, which employ light emitting diodes (LEDS), are formed with seven segments each, and enable the operator to visually check the immediate contents or frame of the display memory 16, and when desired, any frame stored in the main memory 30.

Each time that a key of the keyboard 10 is actuated, the converter 12 is loaded, and four BCD encoded bits or one character are transferred in synchronism with the clocking circuit into the first 4 bit positions of the 64 bit display memory 16. The data that is loaded into the 64 bit display memory 16 is then fed in parallel to the seven segment encoder 22, which acts as a buffer and driver for the display 36. With each actuation of the keyboard, a 4 bit character is shifted into the display memory 16 and the previously stored 4 bit characters are shifted in the feedback loop that includes the two memories 16 and 30.

The loop counter 14 functions to count to 64, and to inhibit the entry of further data into the display memory 16, which contains 64 BCD bits at this time.

When the operator decides to store the data that is displayed in the display memory 16, the ENTER key is actuated. At such time, a gated signal of correct duration from the clock sync. generator 18 enables the loop counter 14 to move its position by 64 counts. The resultant signal LOAD from the generator 18 causes the display memory 16 and the main memory 30 to transfer data from the memory 16 to the main memory 30. The result is that the memory 16 is advanced 64 counts, and the data to the memory 16 is moved forward for 64 counts into the main memory 30. Thus the last frame of data of 16 digits, which is all of the data in the display memory, now is contained in the main memory 30.

When the loop counter 14 has moved 4096 bits, an output signal designated as FULL is generated, and inhibits the clock sync. generator from generating a LOAD signal. The FULL signal also inhibits keyboard 10 from operating and the code converter 12 from transferring data to the display memory 16. In effect, the keyboard 10 is locked or disabled and the stored data in the main memory is maintained in correct synchronism with the position of the loop counter 14.

Upon actuation of the ENTER key, data in the 64 bit display memory 16 is returned to a zero status because its data is transferred out to the main memory 30, and the display shows all zeros. As an alternative, the display 36 may be blank whenever the data is all zeros.

When the operator wants to recall a frame of stored data for visual display and/or possible deletion or modification or editing, the RECALL function is set thereby, enabling the clock sync. generator 18 to provide a series, 4096 clock signals to the loop counter 14. The counter 14 operates the RECALL gate 32 to activate the display memory 16 through the OR gate 34. At the same time, the main memory is activated.

Data from the main memory 30 is shifted through the loop, comprising the display memory 16, main memory 30, RECALL gate 32 and OR gate 34, for 4032 counts, or one frame less than the total frame capacity N of the system. This, in effect, allows the operator to see frame number N-1 on the display 36, i.e., the frame previous to the one that was last displayed.

The CLEAR DISPLAY key is used to erase data currently stored in the display memory 16. This data is deleted by actuation of the CLEAR DISPLAY gate developed in response to key actuation by the sync. generator 18. The gated signal forces data in the display memory to a zero condition, and only operates on that data. At this time, the operator will see an all zero display or a blank pattern on the visual display device 36.

The CLEAR MEMORY key is used to clear the entire system, and to reset the loop counter 14 to a start position. The data in the system is cancelled by actuating the CLEAR MEMORY gate that is produced in the generator 18 in response to the key action. This gated signal is passed to the display memory 16, main memory 30 and the loop counter 14. The gate signal resets all the memory systems in the apparatus, and also resets the loop counter to its start position.

The TRANSMIT key provides a gated signal to a phase locked oscillator (PLO) which is part of the digital-to-audio converter 56. The gated signal causes the PLO to oscillate at one of two audio frequencies. The audio frequency output is directed to a telephone coupler 58, which generates an audible tone signal that may be transmitted over a conventional telephone line or other transmission means.

The transmit function key on keyboard 10 causes the loop counter 14 to be indexed, so that the first data record appears at the output end of the main memory 30. The actuation of the TRANSMIT key also enables a BCD to ASCII converter 52.

When the Transmit key is actuated, loop counter 14 and the data in the main memory 30 is indexed forward, until gating signals derived from the loop counter and the clock sync. generator indicate that the first record is ready for transmission. At this point the loop counter rate of advance is limited to a standard data transmission frequency.

In order to control operation of the transmission function, the sync. generator 18 gating function has a special gate to inhibit or allow variations in speed of data shift around the memory loop, which includes the display memory and main memory. When less than a full memory load of data (less than 64 records) is to be transmitted, the data in the main memory 30 is rapidly advanced as a function of the loop counter 14 and sync. generator 18, until the first record appears. The position of the electronic pointer of the loop counter 14 determines when the first record is available for transmission. When the pointer arrives at the TRANSMIT position in the counter 14, a slowdown gate is generated by the clock sync. generator 18, and data is advanced at a slowed rate from the BCD to ASCII memory converter.

Data from the main memory 30 is then directed to the converter 52, 4 bits at a time, and also to the display memory 16. The visual display 36 shows the encoded numbers of data moving across the display, as the apparatus begins and continues to transmit.

Concurrently data to the converter 52 is examined by the parity generator 54, 4 bits at a time, and a parity bit with standard ASCII start and stop signals from a BCD to ASCII signal generator 60 are added to the raw BCD data in the converter 52.

The new enlarged word or character, consisting of a BCD character plus a parity signal and ASCII start and stop signals, is indexed out to the digital-to-audio converter 56 under control of the loop counter 14. The D/A converter 56 which includes the PLO (a tone generator) is modulated between one and zero levels, such that audio frequencies related to the two levels are generated.

These audio frequency signals are passed to a telephone coupler 58, and transmitted as audible signals for interpretation by a telephone receiver handset. These signals are then serviced at a central processor or computer (not shown).

This operation continues until the counter 14 indicates that all of the data stored in the main memory has been passed through the converter 52. At this time, a gate signal from the counter 14, designated as a post-amble signal, is generated and directed into a unit identifier 62. The identifier serves to identify the particular unit that is transmitting and co-acting with the computer, and provides a security feature. The post-amble gate signal generates an additional 4 BCD characters, which are manually set by switches 64 into the system. The permutation or arrangement switches 64 serve to identify the unit to the computer.

It should be understood that the invention is not limited to the particular configuration and parameters described above. For example, the data may be processed in parallel, as well as serially through the memories. The capacities designated are arbitrary and may be modified or expanded for each of the memories and the display. Other changes may be made within the scope of this invention.

What is claimed is:

1. A keyboard operated terminal apparatus comprising:

a main memory for storing an N number of data frames, each frame consisting of a given number of characters, each character consisting of a finite number of data bits;

a display memory for storing a selected one frame of said N number of data frames;

said data frames being stored statically in said main memory and display memory when the keyboard is not operated;

means including the keyboard for entering characters of data into said display memory;

means for entering a frame of data into said main memory;

means for shifting N-1 frames of data from said main memory and for recalling a selected frame of data for storage in said display memory;

means for displaying a frame of data statically stored in said display memory;

means for converting said N number of data frames stored statically in said main memory to an audio signal, said converting means being coupled to the output of said main memory; and means for transmitting said audio signal to an apparatus other than said terminal apparatus;

said display memory, main memory and means for recalling being coupled in a closed feedback loop.

2. Apparatus as in claim 1, including a loop counter for synchronizing the shifting of data in said memories.

3. Apparatus as in claim 2, including a clock sync. generator for synchronizing and gating said loop counter.

4. Apparatus as in claim 3, wherein said recalling means comprises a recall gate coupled to the output circuit of said clock generator for recalling N-1 frames of data for display and editing.

5. Apparatus as in claim 1, wherein said clock sync. generator includes means for providing gate signals to control said data displaying means and said signal transmitting means.

6. Apparatus as in claim 1, wherein said data converting means comprises a BCD to ASCII memory converter and a digital to audio converter for enabling transmission of said data frames.

7. Apparatus as in claim 6, including a parity generator coupled to said memory converter for adding a parity bit with start and stop signals to the BCD data.

8. Apparatus as in claim 1, including identification signal means coupled to the input of said memory converter.

* * * * *